No. 12,396. REISSUED NOV. 7, 1905.

C. E. BECKWITH.

RAILWAY TORPEDO.

APPLICATION FILED SEPT. 13, 1905.

Witnesses

C. R. Wright Jr.

A. H. Ehrenberg.

Inventor

Charles E. Beckwith

By A. S. Pattison

Attorney

UNITED STATES PATENT OFFICE.

CHARLES E. BECKWITH, OF PEORIA, ILLINOIS, ASSIGNOR, BY MESNE ASSIGNMENTS, TO AMERICAN FOG SIGNAL COMPANY, OF PITTSBURG, PENNSYLVANIA, A CORPORATION OF NEW JERSEY.

RAILWAY-TORPEDO.

No. 12,396. Specification of Reissued Letters Patent. Reissued Nov 7, 1905.

Original No. 790,879, dated May 30, 1905. Application for reissue filed September 13, 1905. Serial No. 278,352

*To all whom it may concern:*

Be it known that I, CHARLES E. BECKWITH, a citizen of the United States, residing at Peoria, in the county of Peoria and State of Illinois, have invented certain new and useful Improvements in Railway-Torpedoes; and I do hereby declare that the following is a full, clear, and exact description of the invention, which will enable others skilled in the art to which it appertains to make and use the same.

This invention relates to improvements in that class of devices known as "railway-torpedoes," and has for its special object to produce a torpedo of entirely different structure from any heretofore made, to reduce the cost of production, and, furthermore, to minimize the chances of moisture entering and impairing the explosive compound within the torpedo.

A further object is to provide a new and effective manner of holding the "clip" to the device and which shall be cheaper in form than any of which I am aware at this time.

Figure 1:
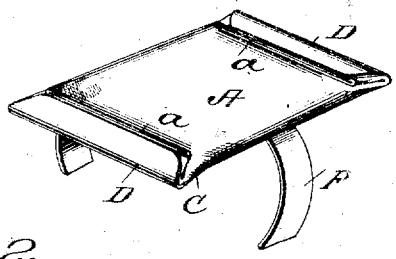
Figure 2:
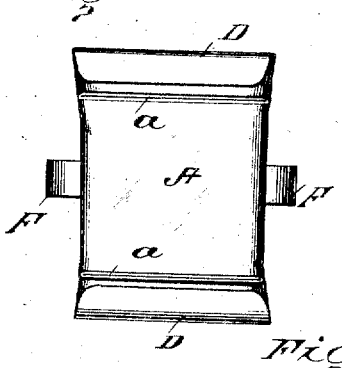
Figure 3:
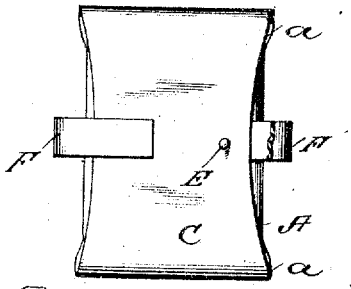
Figure 4:
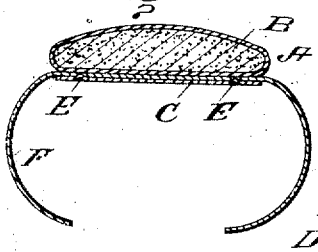
Figure 5:
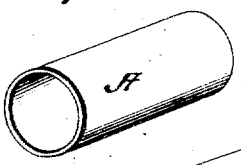
Figure 6:
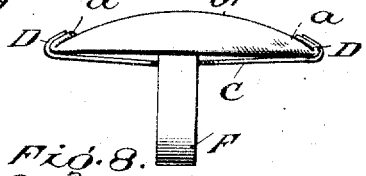
Figure 7:
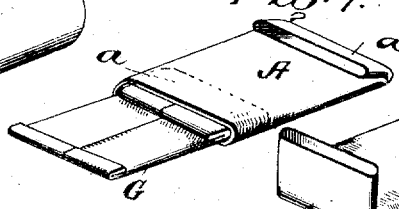
Figure 8:
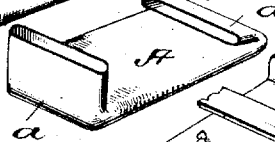
Figure 9:
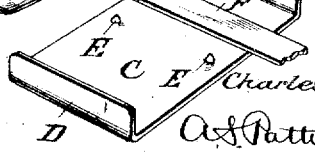

In the drawings herewith appended, Figure 1 is a perspective view of a torpedo as I construct it. Fig. 2 is a top view of the same. Fig. 3 is a view of the under side thereof, showing part of the clip broken away to show an indentation in the carrier of the torpedo. Fig. 4 is a cross-sectional view of the device on line X X, Fig. 2. Fig. 5 is a perspective view of a tube used to form the container or body of the torpedo. Fig. 6 is an edge view of the torpedo. Fig. 7 is a perspective view of the tube shown in Fig. 5, the same being crushed into substantially flat container, with a second container or envelop partly entered therein, this being a modified form of the device. Fig. 8 is a perspective view of the tube shown in Fig. 5 with its ends turned up after said tube is flattened. Fig. 9 is a perspective view of a metal carrier for the tube or container, showing two points of metal pressed into said carrier from below, said figure also showing a strip of metal forming a clip.

In the figures, A is a container for the usual explosive compound, (indicated at B in Fig. 4.) Said container consists, preferably, of a short length of tube, as shown in Fig. 5, which may be of a good weight of paper of tough quality or of other suitable material that will break easily by the expansion of the explosive therein contained. In practice I employ a fiber paper, such as cartridge-paper or the like, though, as stated, other material may be employed to good advantage—such, for instance, as sheet-lead. It is to be kept in mind, however, that my purpose, in addition to the objects above stated, is to provide a torpedo that when exploding will have no pieces of solid material likely to injure any one, even when close to it, so that it is important that the container A be of some substance that will tear open rather than fly into fragments. The tubes are cut into the desired length, and then by means of a suitable press or other implement the short lengths are flattened substantially as shown in Figs. 7 and 8, the ends *a a* being turned up and over at the same time, so as to form a permanent crease, whereby the ends so turned will naturally close over by the stiffness of the paper and normally remain in that position. The envelops or containers thus formed may now be immersed in any waterproofing fluid—such, for instance, as paraffin, asphaltum, varnish, or the like—after which they are filled with the explosive mixture and are then ready to be attached to a suitable carrier. (Shown in Fig. 9.) This carrier (designated by C) consists of a piece of sheet metal formed with upturned ends D and of substantially the same length as the container and within which the latter is placed. However, before placing said container within the carrier a clip composed of a strip of lead F is first laid upon the carrier, there being points pressed in the said carrier from the back, as at E, to form a retaining means for the said strip. Although it has been stated that lead is employed for the device with which to secure the torpedo to the rail, it is to be understood that a steel strip or, in fact, any other material that is fitted for this purpose may be used. The said strip when clamped between the container and the carrier is held tight enough to hold it in place and in turn properly holds the torpedo to the rail; but I prefer to use the points E to form more friction on the strip when so clamped in place, especially if the clip be of lead. The said points or projections are of value for the reason that they sink into the soft metal and effectively prevent movement of said clip.

Figs. 8 and 9 illustrate how the parts are to be assembled—that is, by first providing the carrier C with its projections E, then placing the strip F upon it, followed by the container A. When thus put together, they are placed beneath a die, which when descending serves to close down the ends D of the carrier upon the turned-over ends *a a* of the container in a tight manner, and, in fact, this is so firmly done that it is an impossibility for any moisture, however slight, to enter the container. If preferred, the device thus completed may be dipped into a waterproofing material and is then ready for use.

It is possible to modify the construction of the torpedo, as by providing, if desired, an inner envelop, (shown at G in Fig. 7.) This consists merely of a piece of waterproofed paper or tin-foil, in which the explosive is tightly inclosed against moisture. This envelop is then placed within the container A in lieu of putting the explosive directly into said container. While this particular form may be used, I prefer to employ that above described.

It is quite evident that changes of one kind or another may be made in my improved torpedo without sacrificing any of my rights to the broad ideas.

In manufacturing the torpedo no expensive dies are necessary, as in olden forms of this device, but merely such as will be suitable for flattening and bending over the ends of the containing-tube and afterward close over the ends of the carrier C, as described. The paper tubes can be constructed very easily by the manufacturer and rendered waterproof and bent to the desired form to constitute the container, all of which will be understood. With this inexpensive material, easily formed, and with a small practically flat strip of metal for the carrier and the clip a cheap but perfect torpedo is the result. It is true that the container A may be made by folding over the edges of a strip of paper or metal foil to form a tight envelop, if desired, although a tube prepared as described will be found preferable. Also other means may be used to constitute the carrier, if desired, and different clamping means can also be employed, as I do not wish to confine myself in any way to what is shown and described herein. As an example of the way I may change the device, the ends *a a* of the member A may be turned under against the carrier rather than as shown in the drawings. In this way any moisture that may fall on the device while clamped to the rail will run off, finding no lodgment against said ends. A much neater appearing device would also result. The torpedo is placed upon the rail with its ends D lying across it, so that the curved or inclined end thereof is toward the advancing car-wheel and has a flat bottom, as shown in Fig. 6.

When struck by the wheels of the train, one end is held down, while the container bursts and turns the opposite end of the carrier over upon the rail or bursts that end without tearing it off. It will thus be seen that no flying pieces can result from such explosion, since the paper container is all that can be broken away.

Having thus described my invention, what I claim, and desire to secure by Letters Patent, is—

1. A torpedo of the class described, comprising a tubular waterproofed envelop for containing an explosive compound, such envelop being formed substantially flat in cross-section, and having its ends closed, and a carrier for such envelop adapted to be clamped to the rail.

2. A torpedo of the class described, comprising a tubular envelop of substantially flat cross-section, the ends thereof being closed over upon the body of the envelop and a carrier for such envelop, said carrier adapted to clamp the turned-over ends to close the same moisture-tight, said carrier adapted to be clamped to the rail.

3. A torpedo of the character described, comprising the tubular container A having the closed-over ends *a a*, the explosive compound B therein, the carrier C, its ends D D being closed over upon the said closed-over ends *a a* to keep the same tightly closed and a clamping-strip interposed between the said container and carrier for the purposes set forth.

4. A torpedo of the character described comprising the tubular container A having the closed-over ends *a a*, the explosive B therein, the carrier C, its ends being closed over upon the ends *a a* of the container to keep the same tightly closed, a clamping-strip interposed between the container and the carrier for clamping the torpedo to the rail, and friction-points on the upper surface of the carrier to prevent the said clamping-strip moving for the purposes set forth.

5. A torpedo of the character described comprising a non-metallic container for the explosive and adapted to be clamped to the rail, and a carrier for the same having its ends turned over upon the container and lying at right angles to the length of the rail substantially as set forth and for the purposes described.

6. In a torpedo, a non-metallic waterproof envelop, an explosive compound contained therein, such envelop comprising a tube closed at its ends by having said ends folded tightly over upon it, a carrier member forming a rigid support for the envelop the same having its ends bent over upon the folded ends substantially in the manner shown, said carrier member adapted to be clamped to the rail.

7. In a torpedo, a substantially flat tube closed at its ends by having said ends doubled over upon it, an explosive compound contained in said tube and retained therein by said closed-over ends, a carrier member for the envelop thus constructed, the same adapted for clamping the envelop to the rail.

8. In a torpedo, a non-metallic waterproof tube of substantially flat cross-section having its ends folded over upon said tube to form a tight container or envelop, a metallic carrier member for the envelop, the ends of the former being closed firmly over upon the folded ends to hold the latter shut, and a strip interposed between the envelop and the carrier for clamping the device to the rail, said strip being held between the envelop and carrier by friction substantially as described.

9. An improved torpedo, comprising a case composed of a section of a fiber tube with open ends, a carrier applied thereto and extending longitudinally the tube, the ends of the carrier bent over upon, clamping and holding the ends of the tube closed.

10. An improved torpedo, comprising a tubular case having a flat bottom, a metal carrier applied to the outside of the bottom of the case and extending longitudinally thereof, the carrier having its ends turned over upon clamping and holding the ends of the tube closed in a plane below the middle portion of the tube, and a rail-engaging member applied to the torpedo at right angles to the carrier, whereby the torpedo is supported on the rail with its inclined portion toward the advancing car-wheel.

11. An improved torpedo, comprising a paper case, a metal carrier therefor having opposite inturned flanges clamping the said case, and a rail-engaging device extending in a direction longitudinally the flanges, whereby the torpedo is applied to the rail with the flanges so located that the explosive will throw the flange in a direction longitudinally the track.

12. A torpedo of the class described, comprising a tubular waterproof envelop for containing an explosive compound, such envelop being formed substantially flat in cross-section and having its ends folded over upon it, and a carrier for such envelop adapted to be clamped to the rail.

In testimony whereof I affix my signature in the presence of two witnesses.

CHARLES E. BECKWITH.

Witnesses:

HERBERT R. DENNIS,
ALPHA ARNOLD.